United States Patent
Geffroy

[11] 3,893,675
[45] July 8, 1975

[54] SEALING JOINTS FOR PISTON RINGS

[75] Inventor: Robert Geffroy, Neuilly-sur-Seine, France

[73] Assignee: Sealfire, Luxembourg

[22] Filed: May 10, 1973

[21] Appl. No.: 358,992

[30] Foreign Application Priority Data
May 16, 1972 France .............................. 72.17495

[52] U.S. Cl. ................ 277/194; 277/195; 277/165; 277/194
[51] Int. Cl. ............................................ F16j 15/00
[58] Field of Search ........................... 277/193–197, 277/235, 188, 189

[56] References Cited
UNITED STATES PATENTS

| | | | |
|---|---|---|---|
| 1,405,540 | 2/1922 | Morris | 277/195 |
| 2,709,630 | 5/1955 | Patterson | 277/165 |
| 3,632,121 | 1/1972 | Wahlmark | 277/194 |

*Primary Examiner*—Robert I. Smith
*Attorney, Agent, or Firm*—Farley, Forster and Farley

[57] ABSTRACT

Sealing joint associated with a piston ring for preventing the flow of fluids in piston groove. The sealing joint comprises an edging adapted to bear against that face of the ring which is opposite to the face in contact with the surface with which the piston ring cooperates.

2 Claims, 2 Drawing Figures

SEALING JOINTS FOR PISTON RINGS

It is well known that the efficiency of a piston ring, for instance an engine piston ring, can be increased by inserting a joint made of a material conducive to sealing, such as "Teflon" or annealed copper, between the adjacent faces of a piston ring and a piston ring groove, but experience shows that under the action of fluid pressures exerted at the bottoms of such grooves such joints undergo far greater wear at their outer periphery in contact with the cylinder, than the wear to which the ring is itself subjected.

The invention limits the wear of a joint of this type to that of the ring to which it is associated by providing an edging on the inner periphery of the said joint which, under the influence of the pressure exerted at the bottom of the groove, bears against the inner cylindrical face of the ring.

In accordance with another feature of the invention, the said edging may have a section which, subject to the space necessary for thermal expansion, will fill all the space available at the groove bottom in order to contribute to a decrease of the well known pumping effect when using a sealing ring, as well as contribute a supple guidance of the piston-head in the cylinder, when the material employed for the joint is sufficiently elastic.

Other characteristics and advantages presented by this invention will appear as a result of the description which follows, made with reference to the attached drawing.

Figure 1:
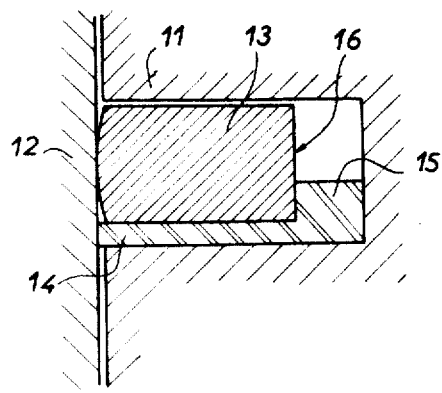
FIG. 1 shows a radial section of an edged joint in accordance with the invention, associated with a ring inside a piston groove.

In FIG. 1 may be seen, in an engine piston 11 which moves within a cylinder 12, a conventional ring 13, aided by a joint 14 that includes an edging 15 which bears against the inner face 16 of ring 13.

Figure 2:
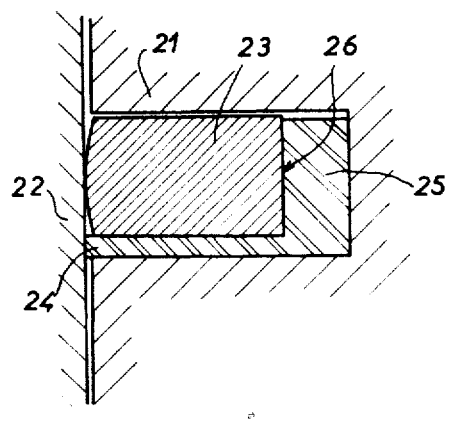
FIG. 2 is a view similar to FIG. 1, in which the joint edging fills up the free space at the groove bottom, allowance being made for thermal expansion.

In FIG. 2 may be seen the same components, piston 21 inside a cylinder 22, having a standard ring 23 and a lateral joint 24 equipped with an edging 25 which, when in operation, bears against the inner face 26 of ring 23.

Edging 25 differs from the preceding edging in that it fills up all the space available at the groove bottom, allowance being made for thermal expansion.

It can also be seen, as regards both joint 14 in FIG. 1 and joint 24 in FIG. 2, that it is impossible for the joint, whatever may be the thrust imparted thereto by fluids under high pressure at the bottom of the groove in the direction of the cylinder, to bear too strongly against the cylinder and hence wear itself out against the cylinder, as edgings 15 or 25 bear against the ring and prevent the sealing joint from being shifted in the direction of the cylinder more than the shift allowed by the wear of the ring.

It can easily be understood that such a device will permit the sealing joint to remain in use for as long a period of time as the wear of the ring remains satisfactory.

Assuming a heel filling up a large part of the groove bottom, the additional and accessory effect is obtained of eliminating the free space at the groove bottom on the one hand, which for an engine is a condition favouring the reduction of unburned hydrocarbons, and, on the other hand, of contributing towards the reduction of oil build-up during the downward stroke of the piston by the clearance between the joint and the adjacent faces of piston and groove.

Finally, a contribution towards the maintenance of the piston-head can be obtained by interposing a plastics part between the ring and the bottom of the groove.

It must be fully understood that the present invention has only been described and illustrated by way of a preferential example, and that equivalent examples will be obvious to a man of the art as regards the constituent elements without, inasmuch, exceeding the scope of the said invention as defined in the accompanying claims.

I claim:

1. A seal comprising an outer cylindrical member of an internal combustion engine, a piston adapted to reciprocate within said member and have one axial end subjected to internal combustion actuating pressure, a groove in the outer periphery of said piston, a ring assembly within said groove consisting of two pieces, one piece being a metal piston ring, the other piece being a plastic sealing joint having a cross section with L-shaped legs, one of said legs extending between adjacent surfaces of said ring and groove remote from said piston end and being adapted to contact said cylindrical member for sealing purposes, the other leg engaging the radially inner face of said metal ring, whereby peripheral wear of the sealing joint against said cylindrical member is limited to the wear of said metal ring, axial clearance between said ring assembly and the groove surface closest to said piston end providing a path for combustion pressure to act on adjacent surfaces of said metal ring and plastic joint.

2. The seal according to claim 1, further characterized by the fact that said other leg fills up, subject to the necessary allowance for thermal expansion, the available space between the piston groove bottom and said radially inner face of the ring.